(12) United States Patent
Zhang et al.

(10) Patent No.: US 11,240,794 B2
(45) Date of Patent: Feb. 1, 2022

(54) METHOD FOR INDICATING PDSCH RECEIVING INFORMATION, DATA RECEIVING METHOD, AND APPARATUS

(71) Applicant: Huawei Technologies Co., Ltd., Shenzhen (CN)

(72) Inventors: Di Zhang, Beijing (CN); Jianqin Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 16/786,103

(22) Filed: Feb. 10, 2020

(65) Prior Publication Data

US 2020/0178231 A1    Jun. 4, 2020

Related U.S. Application Data

(63) Continuation of application No. PCT/CN2018/100075, filed on Aug. 10, 2018.

(30) Foreign Application Priority Data

Aug. 11, 2017 (CN) .......................... 201710687876.1

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01)

(58) Field of Classification Search
CPC ....................... H04W 72/042; H04L 5/0048
See application file for complete search history.

(56) References Cited

U.S. PATENT DOCUMENTS 9,578,532 B2    2/2017 Chun et al.
2013/0136095 A1*    5/2013 Nishio .................... H04L 5/14
(Continued)

FOREIGN PATENT DOCUMENTS

CN    104052572 A    9/2014
CN    104541471 A    4/2015
(Continued)

OTHER PUBLICATIONS

LG Electronics, "Discussion on DL beam management," 3GPP TSG RAN WG1 NR Ad-Hoc#2, R1-1710281, Qingdao, P.R. China, Jun. 27-30, 2017, 5 pages.
(Continued)

*Primary Examiner* — Ronald B Abelson
(74) *Attorney, Agent, or Firm* — Slater Matsil, LLP

(57) ABSTRACT

This application discloses a method for indicating PDSCH receiving information, a data receiving method, and an apparatus. According to this application, a network device generates first indication information, where the first indication information is used to indicate physical downlink shared channel PDSCH receiving information, and the PDSCH receiving information includes information identical to physical downlink control channel PDCCH receiving information; and the network device transmits the first indication information over a PDCCH. This application can be used to improve efficiency of indicating PDSCH receiving information, thereby improving PDSCH receiving performance.

13 Claims, 5 Drawing Sheets

(56) References Cited

U.S. PATENT DOCUMENTS

2017/0013490 A1  1/2017 Lunttila et al.
2018/0219606 A1* 8/2018 Ng ..................... H04L 5/0053

FOREIGN PATENT DOCUMENTS

| CN | 104604314 A | 5/2015 |
|---|---|---|
| CN | 104704754 A | 6/2015 |
| CN | 106537964 A | 3/2017 |
| WO | 2017083489 A1 | 5/2017 |
| WO | 2017095470 A1 | 6/2017 |

OTHER PUBLICATIONS

Interdigital Inc., "On Beam Management for DL Control and Data Channels," 3GPP TSG RAN WG1 NR Ad-Hoc#2, R1-1710924, Qingdao, P.R. China, Jun. 27-30, 2017, 6 pages.
Samsung, "DL beam management for NR," 3GPP TSG RAN WG1 NR Ad-Hoc#2, R1-1710654, Qingdao, P.R. China, Jun. 27-30, 2017, 4 pages.
Ericsson, "Analysis of beam indication signalling options," 3GPP TSG-RAN WG1 #89ah-NR, R1-1711023, Qingdao, P.R. China, Jun. 27-30, 2017, 9 pages.

* cited by examiner

METHOD FOR INDICATING PDSCH RECEIVING INFORMATION, DATA RECEIVING METHOD, AND APPARATUS

CROSS-REFERENCE TO RELATED APPLICATIONS

This application is a continuation of International Application No. PCT/CN2018/100075, filed on Aug. 10, 2018, which claims priority to Chinese Patent Application No. 201710687876.1, filed on Aug. 11, 2017. The disclosures of the aforementioned applications are hereby incorporated by reference in their entireties.

TECHNICAL FIELD

This application relates to the field of wireless communications technologies, and in particular, to a method for indicating physical downlink shared channel (PDSCH) receiving information, a data receiving method, and an apparatus.

BACKGROUND

With advent of smart terminals, especially video services, current spectrum resources can scarcely meet requirements of users for capacities. High-frequency bands with a larger available bandwidth, especially millimeter-wave bands, are increasingly becoming candidate bands for a next-generation communications system. In addition, a communications system uses a multi-antenna technology to increase a capacity and coverage of the system, and the use of the high-frequency bands can further reduce a size of multi-antenna configuration, thereby facilitating obtaining of a site and deployment of more antennas. However, the high-frequency bands lead to a larger path loss. Especially under impact of factors such as atmosphere and vegetation, a loss of radio propagation is further aggravated.

To overcome the foregoing relatively large propagation loss, a common signal transmission mechanism based on a beamforming technology is used to compensate for the foregoing loss in a propagation process of a common signal through a relatively large antenna gain. A terminal can obtain a receiving beam in a beam scanning manner. A base station can alternatively indicate the receiving beam to the terminal. In this way, the terminal can obtain a precise receiving beam based on the receiving beam indicated by the base station, thereby preventing the terminal from scanning the receiving beam for a long time, and saving power.

When the terminal can demodulate a physical downlink control channel (PDCCH) normally but cannot demodulate a physical downlink shared channel (PDSCH), or when PDSCH receiving performance is degraded, the base station needs to indicate new PDSCH receiving information to the terminal. The base station can notify, by using radio resource control (RRC) signaling, the terminal of the new PDSCH receiving information. However, a method for performing the foregoing notification using the RRC signaling has a relatively long delay and relatively low notification efficiency. Consequently, the PDSCH receiving performance is affected.

SUMMARY

Embodiments of this application provide a method for indicating PDSCH receiving information, a data receiving method, and an apparatus to improve efficiency of indicating PDSCH receiving information, and further improve PDSCH receiving performance.

According to a first aspect, a method for indicating PDSCH receiving information is provided, including: generating, by a network device, first indication information, and transmitting the generated first indication information over a PDCCH. The first indication information is used to indicate PDSCH receiving information, and the PDSCH receiving information includes information identical to PDCCH receiving information.

In the foregoing design, the PDSCH receiving information can be used to receive a PDSCH. The first indication information can be transmitted to a terminal over the PDCCH, and the PDSCH receiving information can be transmitted to the terminal by using the first indication information. Therefore, the PDSCH receiving information used by the terminal can be dynamically indicated, and the terminal can receive the PDSCH by using the corresponding PDSCH receiving information. Especially, when the terminal can receive the PDCCH but PDSCH receiving performance is poor or the PDSCH cannot be received, the network device can indicate, through the first indication information, that the PDSCH receiving information is information identical to the PDCCH receiving information. In this way, the terminal can receive the PDSCH by using the information identical to the PDCCH receiving information. Therefore, the PDSCH receiving performance can be improved when the PDSCH receiving performance is poor or the PDSCH cannot be received. In addition, in the foregoing solution, the network device indicates the PDSCH receiving information to the terminal by using the indication information transmitted over the PDCCH. Compared with an implementation in which notification is performed over RRC signaling, the foregoing solution can improve efficiency of indicating the PDSCH receiving information and further improve the PDSCH receiving performance.

In a possible design, the network device may further transmit second indication information over the PDCCH, where the second indication information is used to indicate the PDSCH receiving information identical to the PDCCH receiving information, information indicated by the second indication information is one of N pieces of PDCCH receiving information configured for a terminal, and N is an integer greater than 1.

In the foregoing design, for a scenario in which a plurality of pieces of PDCCH receiving information are configured, one of the plurality of pieces of PDCCH receiving information that is specifically the information that is identical to the PDCCH receiving information and that is indicated by the first indication information can be indicated to the terminal through the second indication information. In this way, the terminal can receive the PDSCH by using the corresponding receiving information.

In a possible design, the first indication information and the second indication information are located in different information fields in the same DCI, or in different fields of a same information field in the same DCI. Alternatively, the first indication information and the second indication information are located in different pieces of DCI. Alternatively, after the first indication information and the second indication information are joint-coded, the joint-coded indication information is carried in a piece of DCI.

In a possible design, the information identical to the PDCCH receiving information is pre-agreed. In this design, for a scenario in which a plurality of pieces of PDCCH receiving information are configured, the terminal may be enabled, through pre-agreement, to determine one of the plurality of pieces of PDCCH receiving information that is specifically the information that is identical to the PDCCH receiving information and that is indicated by the first indication information. In this way, the terminal can receive the PDSCH by using the corresponding receiving information.

In a possible design, the pre-agreed PDCCH receiving information is receiving information with highest receiving channel quality among all pieces of receiving information for the terminal to receive a PDCCH. In this design, when the first indication information transmitted by the network device indicates that the PDSCH receiving information is information identical to the PDCCH receiving information, the terminal can determine, based on the foregoing pre-agreement, the PDCCH receiving information that is identical to the PDSCH receiving information, and can receive the PDSCH by using the corresponding receiving information. When PDCCH receiving performance is good, PDSCH receiving performance is usually also good. Therefore, this design can improve the PDSCH receiving performance.

In a possible design, the PDCCH receiving information is: receiving information that corresponds to a PDCCH detection resource and that is configured for the terminal.

In a possible design, the PDSCH receiving information or PDCCH receiving information is: a reference signal resource index transmitted by the network device; or QCL information that is associated with a reference signal resource and that is transmitted by the network device.

In a possible design, if the terminal receives the PDCCH by using an analog receiving beam, a PDCCH decoding delay may occur. Based on information such as a capability of the terminal, the terminal may determine duration of the PDCCH decoding delay and report the duration to the network device, or the network device configures the duration of the PDCCH decoding delay of the terminal for the terminal, or predefines the duration of the PDCCH decoding delay. The network device may further transmit configuration information to the terminal by using higher layer signaling, layer 2 signaling, or layer 1 signaling. The configuration information indicates to the terminal, within a PDCCH decoding delay period, whether the PDSCH receiving information is identical to the PDCCH receiving information, identical to synchronization signal block (SS block) receiving information, or identical to receiving information corresponding to other reference signals, and may further indicate a piece of information in a PDCCH receiving information set or in an SS block receiving information set that is identical to the PDSCH receiving information. In this way, the terminal can receive the PDSCH within the PDCCH decoding delay period by using the information identical to the PDCCH receiving information or identical to the SS block receiving information.

Based on the foregoing solution, in a downlink transmission process, the network device transmits the first indication information over the PDCCH to indicate the PDSCH receiving information to the terminal. During the PDCCH decoding delay period, the terminal receives the PDSCH based on the receiving information indicated by the configuration information (for example, receives the PDSCH by using the information identical to the PDCCH receiving information or identical to the SS block receiving information). After the PDCCH decoding delay, the terminal can obtain the first indication information through decoding based on the PDCCH. Therefore, based on the first indication information obtained through decoding, the terminal can use the PDSCH receiving information indicated by the indication information to receive data transmitted over the PDSCH.

Based on the foregoing solution, existence of an additional DMRS may be implicitly indicated through the first indication information. For example, if the first indication information transmitted by the network device does not include the indication information of the PDSCH receiving information, it indicates that no additional DMRS exists; or if the first indication information transmitted by the network device includes the indication information of the PDSCH receiving information, it indicates that an additional DMRS exists. Compared with a method in which existence of an additional DMRS is indicated through dynamic signaling, the method in which existence of an additional DMRS is implicitly indicated can reduce signaling overheads.

According to a second aspect, a data receiving method is provided, including: receiving, by a terminal, first indication information transmitted by a network device over a PDCCH, and receiving, based on PDSCH receiving information indicated by the first indication information, data transmitted over a PDSCH. The first indication information is used to indicate the PDSCH receiving information, and the PDSCH receiving information includes information identical to PDCCH receiving information.

In a possible design, the terminal may further receive second indication information transmitted by the network device over the PDCCH, where the second indication information is used to indicate the PDSCH receiving information identical to the PDCCH receiving information, information indicated by the second indication information is one of N pieces of PDCCH receiving information configured for the terminal, and N is an integer greater than 1.

In a possible design, the information identical to the PDCCH receiving information is pre-agreed.

In a possible design, the pre-agreed information identical to the PDCCH receiving information is receiving information with highest receiving channel quality among all pieces of receiving information for the terminal to receive a PDCCH.

In a possible design, the PDCCH receiving information is: receiving information that corresponds to a PDCCH detection resource and that is configured for the terminal.

In a possible design, the PDSCH receiving information or PDCCH receiving information is: a reference signal resource index transmitted by the network device; or QCL information that is associated with a reference signal resource and that is transmitted by the network device.

According to a third aspect, an embodiment of this application further provides an apparatus for indicating PDSCH receiving information. The apparatus may be a network device, and more specifically, may be a base station. The apparatus has a function of implementing actions of the network device described in the method example according to the first aspect. The function may be implemented by hardware, or may be implemented by hardware executing corresponding software. The hardware or software includes one or more modules corresponding to the foregoing function.

In a possible design, a structure of the network device includes a processor and a transceiver. The processor and the transceiver can perform corresponding functions in the method example according to the first aspect. For details, refer to the detailed description in the method example according to the first aspect, and no repeated description is given herein.

According to a fourth aspect, an embodiment of this application further provides a data receiving apparatus. The apparatus may be a terminal. The apparatus has a function of implementing actions of the terminal described in the method example according to the second aspect. The function may be implemented by hardware, or may be implemented by hardware executing corresponding software. The hardware or software includes one or more modules corresponding to the foregoing function.

In a possible design, a structure of the terminal includes a processor and a transceiver. The processor and the transceiver can perform corresponding functions in the method example according to the second aspect. For details, refer to the detailed description in the method example according to the second aspect, and no repeated description is given herein.

According to a fifth aspect, an embodiment of this application further provides a computer storage medium. The computer-readable storage medium stores a computer-executable instruction. The computer-executable instruction is used to enable a computer to perform the corresponding method described in the example according to the first aspect.

According to a sixth aspect, an embodiment of this application further provides a computer storage medium. The computer-readable storage medium stores a computer-executable instruction. The computer-executable instruction is used to enable a computer to perform the corresponding method described in the example according to the second aspect.

According to a seventh aspect, an embodiment of this application provides a chip. The chip includes a processor, configured to support a terminal in implementing functions related to the network device in the first aspect. In a possible design, the chip further includes a memory, and the memory is configured to store a program instruction and data that are necessary for the terminal.

According to an eighth aspect, an embodiment of this application provides a chip. The chip includes a processor, configured to support a terminal in implementing functions related to the terminal in the first aspect. In a possible design, the chip further includes a memory, and the memory is configured to store a program instruction and data that are necessary for the terminal.

According to a ninth aspect, an embodiment of this application provides a data receiving method. The method includes: receiving, by a terminal, configuration information transmitted by a network device, and receiving a PDSCH in a PDCCH decoding delay period based on PDCCH receiving information indicated by the configuration information. The configuration information indicates the PDCCH receiving information, and the PDCCH receiving information is used for the terminal to receive a physical downlink shared channel PDSCH in the PDCCH decoding delay period.

In a possible design, the PDCCH receiving information is receiving information that corresponds to a resource in a PDCCH control resource set and that is configured for the terminal.

In a possible design, the PDCCH receiving information is a reference signal resource index, or quasi co-location assumption QCL information associated with a reference signal resource.

In a possible design, the method further includes: receiving, by the terminal, the PDSCH outside the PDCCH decoding delay period based on PDSCH receiving information indicated by downlink control information DCI transmitted over the PDCCH.

In a possible design, the method further includes: transmitting, by the terminal, terminal capability information to the network device, where the terminal capability information is used to indicate duration of the PDCCH decoding delay period of the terminal.

In a possible design, the configuration information is transmitted by the network device to the terminal by using higher layer signaling and/or layer 2 signaling.

According to a tenth aspect, an embodiment of this application provides a method for indicating PDSCH receiving information, including: transmitting, by a network device, configuration information to a terminal, where the configuration information indicates PDCCH receiving information, and the PDCCH receiving information is used for the terminal to receive a physical downlink shared channel PDSCH in a PDCCH decoding delay period.

In a possible design, the PDCCH receiving information is receiving information that corresponds to a resource in a PDCCH control resource set and that is configured for the terminal.

In a possible design, the PDCCH receiving information is a reference signal resource index, or quasi co-location assumption QCL information associated with a reference signal resource.

In a possible design, the network device transmits the configuration information by using higher layer signaling and/or layer 2 signaling.

According to an eleventh aspect, an embodiment of this application provides a terminal, including: a transceiver module, configured to receive configuration information transmitted by a network device, where the configuration information indicates physical downlink control channel PDCCH receiving information, and the PDCCH receiving information is used for the terminal to receive a physical downlink shared channel PDSCH in a PDCCH decoding delay period, where the transceiver module is further configured to receive the PDSCH in the PDCCH decoding delay period based on the PDCCH receiving information indicated by the configuration information.

In a possible design, the PDCCH receiving information is receiving information that corresponds to a resource in a PDCCH control resource set and that is configured for the terminal.

In a possible design, the PDCCH receiving information is a reference signal resource index, or quasi co-location assumption QCL information associated with a reference signal resource.

In a possible design, the transceiver module is further configured to: receive the PDSCH outside the PDCCH decoding delay period based on PDSCH receiving information indicated by downlink control information DCI transmitted over the PDCCH.

In a possible design, the transceiver module is further configured to: transmit terminal capability information to the network device, where the terminal capability information is used to indicate duration of the PDCCH decoding delay period of the terminal.

In a possible design, the configuration information is transmitted by the network device to the terminal by using higher layer signaling and/or layer 2 signaling.

According to a twelfth aspect, an embodiment of this application provides a network device, including: a transceiver module, configured to transmit configuration information to a terminal, where the configuration information indicates physical downlink control channel PDCCH receiving information, and the PDCCH receiving information is used for the terminal to receive a physical downlink shared channel PDSCH in a PDCCH decoding delay period.

In a possible design, the PDCCH receiving information is receiving information that corresponds to a resource in a PDCCH control resource set and that is configured for the terminal.

In a possible design, the PDCCH receiving information is a reference signal resource index, or quasi co-location assumption QCL information associated with a reference signal resource.

In a possible design, the transceiver module is specifically configured to: transmit the configuration information by using higher layer signaling and/or layer 2 signaling.

According to a thirteenth aspect, an embodiment of this application provides a terminal, including a processor, a memory, and a transceiver. The memory is configured to store an instruction, and the processor is configured to execute the instruction stored in the memory to implement the method according to any implementation of the ninth aspect.

According to a fourteenth aspect, an embodiment of this application provides a network device, including a processor, a memory, and a transceiver. The memory is configured to store an instruction, and the processor is configured to execute the instruction stored in the memory to implement the method according to any implementation of the tenth aspect.

According to a fifteenth aspect, an embodiment of this application provides an apparatus, including a processor. The processor is configured to execute an instruction to implement the method according to any implementation of the ninth aspect.

According to a sixteenth aspect, an embodiment of this application provides an apparatus, including a processor. The processor is configured to execute an instruction to implement the method according to any implementation of the tenth aspect.

According to a seventeenth aspect, an embodiment of this application provides a computer-readable storage medium. The computer-readable storage medium stores a computer-executable instruction, and the computer-executable instruction is used to enable a computer to perform the method according to any implementation of the ninth aspect.

According to an eighteenth aspect, an embodiment of this application provides a computer-readable storage medium. The computer-readable storage medium stores a computer-executable instruction, and the computer-executable instruction is used to enable a computer to perform the method according to any implementation of the tenth aspect.

According to a nineteenth aspect, an embodiment of this application provides an apparatus, and the apparatus is configured to implement the method according to any implementation of the first aspect.

According to a twentieth aspect, an embodiment of this application provides an apparatus, and the apparatus is configured to implement the method according to any implementation of the second aspect.

According to a twenty-first aspect, an embodiment of this application provides an apparatus, and the apparatus is configured to implement the method according to any implementation of the ninth aspect.

According to a twenty-second aspect, an embodiment of this application provides an apparatus, and the apparatus is configured to implement the method according to any implementation of the tenth aspect.

According to a twenty-third aspect, a computer program product including an instruction is provided. When the computer program product is run on a computer, the computer is enabled to perform the method according to any implementation of the first aspect.

According to a twenty-fourth aspect, a computer program product including an instruction is provided. When the computer program product is run on a computer, the computer is enabled to perform the method according to any implementation of the second aspect.

According to a twenty-fifth aspect, a computer program product including an instruction is provided. When the computer program product is run on a computer, the computer is enabled to perform the method according to any implementation of the ninth aspect.

According to a twenty-sixth aspect, a computer program product including an instruction is provided. When the computer program product is run on a computer, the computer is enabled to perform the method according to any implementation of the tenth aspect.

DETAILED DESCRIPTION OF ILLUSTRATIVE EMBODIMENTS

The following describes embodiments of this application with reference to accompanying drawings.

First, some terms in this application are described below to help a person skilled in the art have a better understanding.

(1) Network device: may be referred to as a radio access network (Radio Access Network, RAN) device, is a device that enables a terminal to access a radio network, and includes but is not limited to: an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), a transmission point (TP) or transmission and reception point (TRP)), or a next-generation NodeB (gNB).

(2) Terminal: is a device that provides voice and/or data connectivity to a user, and may include various handheld devices, in-vehicle devices, wearable devices, computing devices, and drones that have wireless communication functions, or other processing devices connected to a wireless modem, and diversified user equipment (UE), mobile stations (MS), terminal equipment, transmission points, and the like.

(3) Interaction: interaction in this application is a process of mutually transferring information between two interaction parties, where the transferred information may be the same or different. For example, if the two interaction parties are a base station 1 and a base station 2, the base station 1 may request information from the base station 2, and the base station 2 may provide the base station 1 with the information requested by the base station 1. Alternatively, the base station 1 and the base station 2 may request information from each other, where the information requested may be the same or different.

(4) "A plurality of" refers to two or more. The term "and/or" describes an association relationship between associated objects and represents three possible relationships. For example, A and/or B may represent A alone, both A and B, and B alone. The character "/" generally indicates an "or" relationship between associated objects.

Embodiments of this application provide a method for indicating PDSCH receiving information, a data receiving method, and an apparatus based on such methods. The apparatus includes a network device and a terminal. The network device may be a RAN node or a base station. The methods and the apparatus are based on the same inventive concept. Because principles for the methods and the apparatus to resolve a problem are similar, cross reference to implementation of the methods and implementation of the apparatus may be made.

Figure 1:
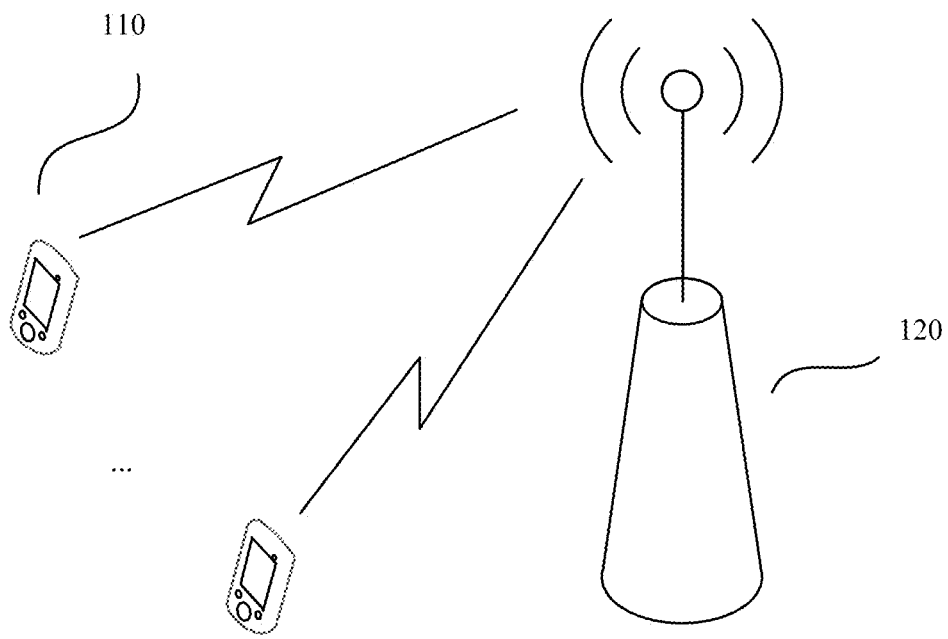
FIG. 1 is a schematic diagram of a possible communications system according to an embodiment of this application.

FIG. 1 is an example of a schematic diagram of a possible communications system according to an embodiment of this application. As shown in FIG. 1, a terminal 110 accesses a radio network through a base station 120, and the terminal 110 interacts with the base station 120 to obtain services from an external network (such as the Internet) through the base station, or to communicate with other terminals through the base station. Transmitting a signal from the terminal 110 to the base station 120 is referred to as uplink transmission, and transmitting a signal from the base station 120 to the terminal 110 is referred to as downlink transmission. In the foregoing communications system, the base station 120 may be replaced with another network device such as a RAN node.

A network architecture described in this embodiment of this application is intended for better clarifying technical solutions in the embodiments of this application, and does not constitute a limitation on the technical solutions provided in the embodiments of this application. A person of ordinary skill in the art is aware that with evolution of the network architecture, the technical solutions provided in the embodiments of this application are also applicable to similar technical problems. For example, the technical solutions provided in the embodiments of this application are applicable to a 5G new radio (NR) communications system.

Based on the foregoing communications system, a network device may transmit downlink control information to the terminal over a PDCCH, and transmit user data to the terminal over a PDSCH.

The PDCCH is a set of a group of physical resource elements (RE), and carries uplink and downlink control information, mainly including physical uplink shared channel (PUSCH) control information and PDSCH control information. The PDSCH control information may include indication information of PDSCH receiving information. Such control information carried in downlink control information (DCI) of the PDCCH is transmitted. Pieces of DCI of different terminals are distinguished through radio network temporary identifiers (RNTI) corresponding to the terminals. For example, cyclic redundancy check (CRC) of DCI of a terminal is scrambled by using an RNTI of the terminal.

Figure 2:
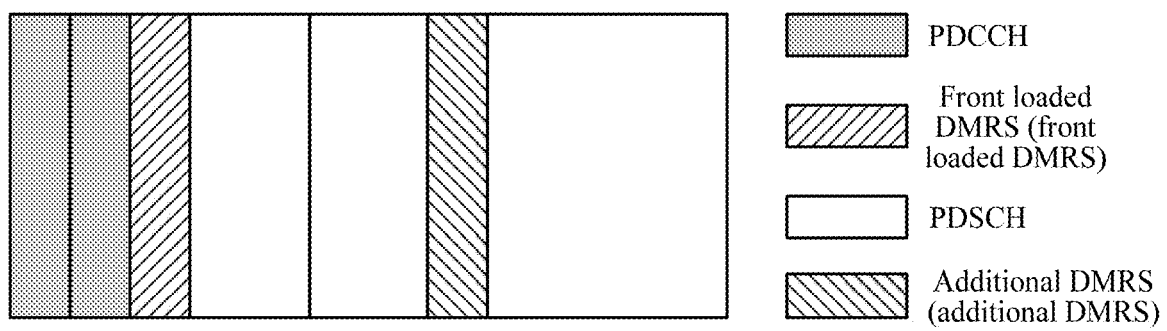
FIG. 2 is a schematic diagram of a PDCCH and a PDSCH according to an embodiment of this application.

The PDCCH usually occupies one, two, or three orthogonal frequency division multiplexing (OFDM) symbols of each subframe in time domain (when a system bandwidth is 1.4 MHz, the PDCCH may occupy four OFDM symbols). The PDSCH occupies remaining OFDM symbols of the subframe. A demodulation reference signal (DMRS) may be transmitted on some symbols occupied by the PDCCH, and a PDSCH domain may include a front loaded DMRS and an additional DMRS. FIG. 2 shows an example of a resource location relationship between the PDCCH and the PDSCH.

In the embodiments of this application, the network device can indicate, through the indication information that is used to indicate the PDSCH receiving information, information identical to the PDCCH receiving information to the terminal, so that the terminal can receive the PDSCH by using the information identical to the PDCCH receiving information.

The PDSCH receiving information is used to enable the terminal to receive the PDSCH. The PDCCH receiving information is used to enable the terminal to receive the PDCCH. The receiving information may be one type of the following information: receiving beam information, reference signal resource information, and QCL information. The quasi co-location assumption QCL information may also be referred to as co-location assumption (QCL). The receiving information is used to assist in describing beamforming information at a receive end of the terminal and a receiving process.

The receiving beam information is used to indicate a corresponding receiving beam, and the receiving beam information is index information of the receiving beam.

The reference signal resource information includes a reference signal resource index. The reference signal resource index corresponds to a transmit-receive beam pair previously established when measurement is performed based on the reference signal resource. Through the reference signal resource index, the terminal can infer the receiving beam that is used to receive the PDSCH or the PDCCH, that is, obtain the receiving information that is used to receive the PDSCH or the PDCCH.

The QCL information may include at least one of: a beam group index number of a reference signal, a resource index number of the reference signal, a port number of the reference signal, and a port group number of the reference signal that are reported by the terminal. The beam group index number that is of the reference signal and that is reported by the terminal is equivalent to a resource set index number that is of the reference signal and that is reported by the terminal. The resource index number that is of the reference signal and that is reported by the terminal may be a relative index number based on a set of a plurality of resource index numbers reported by the terminal. For example, if the terminal reports four absolute resource index numbers {1, 5, 7, 9} of the reference signal, a relative resource index number of the reference signal is any one in {0, 1, 2, 3} based on a reporting result of the terminal. The relative resource index number 0 corresponds to the resource index number 1 that is of the reference signal and that is reported by the terminal, the relative resource index number 1 corresponds to the resource index number 5 that is of the reference signal and that is reported by the terminal, the relative resource index number 2 corresponds to the resource index number 7 that is of the reference signal and that is reported by the terminal, and the relative resource index number 3 corresponds to the resource index number 9 that is of the reference signal and that is reported by the terminal.

In a specific implementation, a network device side may indicate that a QCL relationship is satisfied between a demodulation reference signal (DMRS) of the PDSCH or the PDCCH and one or more of the plurality of reference signal resources previously reported by the terminal. For example, the reference signal may be a channel state information reference signal (CSI-RS). Herein, each reported CSI-RS resource index corresponds to a transmit-receive beam pair previously established when measurement is performed based on the CSI-RS resource. Understandably, two reference signals or channels that satisfy the QCL relationship have the same receiving beam information. Therefore, based on the reference signal resource index, the terminal can infer the receiving information that is used to receive the PDSCH or the PDCCH.

The reference signal used above may be a CSI-RS, an SS block, or another reference signal. Specific types of the reference signal are not limited in the embodiments of this application.

Optionally, as described above, the QCL information may also include some spatial characteristic parameters such as an azimuth angle of departure (AoD), a zenith angle of departure (ZOD), an azimuth angle spread of departure (ASD), a zenith angle spread of departure (ZSD), parameters related to an angle of arrival, an azimuth angle of arrival (AoA), a zenith angle of arrival (ZoA), an azimuth angle spread of arrival (ASA), and a zenith angle spread of arrival (ZSA). Such spatial characteristic parameters describe spatial channel characteristics between antenna ports of reference signals, and help the terminal complete beamforming or a receiving process at a receive end based on the QCL information.

In the embodiments of this application, the network device can indicate the PDSCH receiving information by using the DCI, so that the terminal receives the PDSCH by using the corresponding PDSCH receiving information. The PDSCH receiving information indicated by the network device by using the DCI includes the information identical to the PDCCH receiving information, so that the terminal can use the information identical to the PDCCH receiving information to receive the data transmitted over the PDSCH.

Further, when a plurality of pieces of PDCCH receiving information are configured for the terminal, the network device further notifies the terminal of the information identical to the PDCCH receiving information, or pre-agrees the information identical to the PDCCH receiving information, so that the terminal can determine one of the plurality of pieces of PDCCH receiving information configured for the terminal that is the information identical to the PDCCH receiving information.

In the embodiments of this embodiment, the PDSCH receiving information may be indicated by using a reference signal resource index transmitted by the network device, may be indicated by using a QCL that is associated with the reference signal resource and that is transmitted by the network device, or may be indicated by using other information such as a beam pair link BPL. The Quasi-Co-Location (QCL) may be construed as quasi co-location assumption information, but may alternatively be construed in other ways. For specific meanings of the QCL, refer to related communications protocols. The PDCCH receiving information may be indicated by using the reference signal resource index transmitted by the network device, may be indicated by using QCL information that is associated with the reference signal resource and that is transmitted by the network device, or may be indicated by using other information such as a BPL.

The QCL may indicate an inter-channel correlation, an inter-signal correlation, or an inter-resource correlation. A QCL correspondence between some resources (such as reference signal resources) and the PDSCH receiving information (such as a PDSCH receiving beam) may be pre-agreed or preconfigured. A beam pair may be obtained through beam training, and the beam pair may be identified by using a BPL. Through a beam training process, the network device can obtain N (N is an integer greater than or equal to 1) beam pairs, and the N BPLs are used for data transmission in a communication process between the network device and the terminal to obtain relatively good communication performance. A beam pair of a downlink channel may be denoted as <Bx, B'x>, where Bx represents a transmitting beam of the network device, and B'x represents a receiving beam of the terminal. A beam pair of an uplink channel may be denoted as <By, B'y>, where By represents a transmitting beam of the terminal, and B'y represents a receiving beam of the network device. For example, a beam pair of the PDSCH includes a PDSCH transmitting beam and a PDSCH receiving beam. For another example, a beam pair of the PDCCH includes a PDCCH transmitting beam and a PDCCH receiving beam, where the beam may be identified through reference signal resource information.

In the embodiments of this application, the DCI for indicating the PDSCH receiving information may include an indication information field of the PDSCH receiving information. Information carried in the indication information field is indication information of the PDCCH receiving information or indication information of the PDSCH receiving information. Specifically, the PDSCH receiving information may be directly indicated through the information carried in the information field. For example, the information carried in the information field is a PDSCH receiving beam index value or a mapping value of a PDSCH receiving beam index value. Alternatively, the PDSCH receiving information may be indirectly indicated through the information carried in the information field. For example, as described above, the information carried in the information field is the reference signal resource index transmitted by the network device or indication information of the index. Because the reference signal resource index is in a correspondence with the PDSCH receiving information (such as the PDSCH receiving beam), the PDSCH receiving information or a PDSCH receiving resource can be indirectly indicated through the information carried in the information field. For another example, as described above, the information carried in the information field is the QCL information that is associated with the reference signal resource and that is transmitted by the network device or indication information of the QCL, or is the BPL of the beam pair or indication information of the BPL.

Using an example in which PDSCH receiving information is beam information, several methods for indicating a PDSCH receiving beam by extending a value of an indication information field of the PDSCH receiving beam in DCI are described below.

Using an example in which the indication information field of the PDSCH receiving beam in the DCI is used to carry an index value of the PDSCH receiving beam, if a network device configures three PDSCH receiving beams for a terminal, and the index value of the PDSCH receiving beam is indicated by using two bits, a value of indication information of the PDSCH receiving beam may be shown in Table 1 below:

TABLE 1

| Value of indication information of a PDSCH receiving beam | Meaning of the indication information of the PDSCH receiving beam |
| --- | --- |
| 00 | Index value of a PDSCH receiving beam 1 |
| 01 | Index value of a PDSCH receiving beam 2 |
| 10 | Index value of a PDSCH receiving beam 3 |
| 11 | PDCCH receiving beam |

In Table 1, the index values of the three PDSCH receiving beams are 0, 1, and 2 respectively. A length of the indication information of the PDSCH receiving beam is two bits. The value 00 of the indication information field is used to indicate the PDSCH receiving beam 1, the value 01 of the indication information field is used to indicate the PDSCH receiving beam 2, and the value 10 of the indication information field is used to indicate the PDSCH receiving beam 3. The value "11" of the indication information field is used to indicate that the PDSCH receiving beam is a beam identical to the PDCCH receiving beam.

In another example, three PDSCH receiving beams are still configured by the network device for the terminal, and the index value of the PDSCH receiving beam is indicated by using two bits. In this case, the value of the indication information of the PDSCH receiving beams may be shown in Table 2 below:

TABLE 2

| Value of indication information of a PDSCH receiving beam | Meaning of the indication information of the PDSCH receiving beam |
| --- | --- |
| 00 | PDCCH receiving beam |
| 01 | Index value of a PDSCH receiving beam 1 |
| 10 | Index value of a PDSCH receiving beam 2 |
| 11 | Index value of a PDSCH receiving beam 3 |

In Table 2, the index values of the three PDSCH receiving beams are 1, 2, and 3 respectively. A length of the indication information of the PDSCH receiving beam is two bits. The value 01 of the indication information field is used to indicate the PDSCH receiving beam 1, the value 10 of the indication information field is used to indicate the PDSCH receiving beam 2, and the value 11 of the indication information field is used to indicate the PDSCH receiving beam 3. The value "00" of the indication information field is used to indicate that the PDSCH receiving beam is a beam identical to the PDCCH receiving beam.

Using an example in which the indication information field of the PDSCH receiving beam in the DCI is used to carry the BPL of the PDSCH, if three PDSCH beam pairs are configured by the network device for the terminal, and the BPL is indicated by using two bits, the value of the indication information of the PDSCH receiving beams may be shown in Table 3 below:

TABLE 3

| Value of indication information of a PDSCH receiving beam | Meaning of the indication information of the PDSCH receiving beam |
| --- | --- |
| 00 | BPL (BPL1) of a PDSCH beam pair 1 |
| 01 | BPL (BPL2) of a PDSCH beam pair 2 |
| 10 | BPL (BPL3) of a PDSCH beam pair 3 |
| 11 | PDCCH beam pair |

In Table 3, values of the BPLs of the three PDSCH beam pairs are 0, 1, and 2 respectively. A length of the indication information of the PDSCH receiving beam is two bits. The value 00 of the indication information field is used to indicate the PDSCH beam pair 1 (the beam pair includes the PDSCH transmitting beam and the PDSCH receiving beam), that is, the PDSCH receiving beam is indirectly indicated by using the beam pair 1. The value 01 of the indication information field is used to indicate the PDSCH beam pair 2, that is, the PDSCH receiving beam is indirectly indicated by using the beam pair 2. The value 10 of the indication information field is used to indicate the PDSCH beam pair 3, that is, the PDSCH receiving beam is indirectly indicated by using the beam pair 3. The value "11" of the indication information field is used to indicate that the PDSCH beam pair is a beam pair identical to the PDCCH beam pair, thereby indirectly indicating the PDSCH receiving beam.

In another example, three PDSCH beam pairs are still configured by the network device for the terminal, and the BPL is indicated by using two bits. In this case, the value of the indication information of the PDSCH receiving beam may be shown in Table 4 below:

TABLE 4

| Value of indication information of a PDSCH receiving beam | Meaning of the indication information of the PDSCH receiving beam |
| --- | --- |
| 00 | PDCCH beam pair |
| 01 | BPL (BPL1) of a PDSCH beam pair 1 |
| 10 | BPL (BPL2) of a PDSCH beam pair 2 |
| 11 | BPL (BPL3) of a PDSCH beam pair 3 |

In Table 4, values of the BPLs of the three PDSCH beam pairs are 1, 2, and 3 respectively. A length of the indication information of the PDSCH receiving beam is two bits. The value 01 of the indication information field is used to indicate the PDSCH beam pair 1 (the beam pair includes the PDSCH transmitting beam and the PDSCH receiving beam), that is, the PDSCH receiving beam is indirectly indicated by using the beam pair 1. The value 10 of the indication information field is used to indicate the PDSCH beam pair 2, that is, the PDSCH receiving beam is indirectly indicated by using the beam pair 2. The value 11 of the indication information field is used to indicate the PDSCH beam pair 3, that is, the PDSCH receiving beam is indirectly indicated by using the beam pair 3. The value "00" of the indication information field is used to indicate that the PDSCH beam pair is a beam pair identical to the PDCCH beam pair, thereby indirectly indicating the PDSCH receiving beam.

Using an example in which the indication information field of the PDSCH receiving beam in the DCI is used to carry the QCL that is associated with the reference signal resource and that is transmitted by the network device, if the network device configures three QCLs for the terminal, and the QCL is indicated by using two bits, the value of the indication information of the PDSCH receiving beam may be shown in Table 5 below:

TABLE 5

| Value of indication information of a PDSCH receiving beam | Meaning of the indication information of the PDSCH receiving beam |
| --- | --- |
| 00 | QCL 1: The PDSCH is associated with a CSI-RS 1, an SS block 1, or another reference signal (such as a DMRS) |
| 01 | QCL 2: The PDSCH is associated with a CSI-RS 2, an SS block 2, or another reference signal (such as a DMRS) |
| 10 | QCL 3: The PDSCH is associated with a CSI-RS 3, an SS block 3, or another reference signal (such as a DMRS) |
| 11 | QCL 4: The PDSCH is associated with the PDCCH |

In Table 5, a length of the indication information of the PDSCH receiving beam is two bits. Corresponding PDSCH receiving beams can be indirectly indicated by using different QCL values. The value "11" of the indication information field is used to indicate that the PDSCH is associated with the PDCCH, that is, it is indirectly indicated that the PDSCH receiving beam is identical to the PDCCH receiving beam.

In another example, the QCL is still indicated by using two bits. In this case, the value of the indication information of the PDSCH receiving beam may be shown in Table 6 below:

TABLE 6

| Value of indication information of a PDSCH receiving beam | Meaning ot the indication information of the PDSCH receiving beam |
| --- | --- |
| 00 | QCL 4: The PDSCH is associated with the PDCCH |
| 01 | QCL 1: The PDSCH is associated with a CSI-RS 1, an SS block 1, or another reference signal (such as a DMRS) |
| 10 | QCL 2: The PDSCH is associated with a CSI-RS 2, an SS block 2, or another reference signal (such as a DMRS) |
| 11 | QCL 3: The PDSCH is associated with a CSI-RS 3, an SS block 3, or another reference signal (such as a DMRS) |

In Table 4, a length of the indication information of the PDSCH receiving beam is two bits. Corresponding PDSCH receiving beams can be indirectly indicated by using different QCL values. The value "00" of the indication information field is used to indicate that the PDSCH is associated with the PDCCH, that is, it is indirectly indicated that the PDSCH receiving beam is identical to the PDCCH receiving beam.

When the network device configures only one piece of PDCCH receiving information for the terminal, based on the foregoing embodiment, if the PDSCH receiving information indicated by the network device to the terminal by using the first indication information is the information identical to the PDCCH receiving information, the terminal may use, based on the first indication information, the receiving information indicated by the only PDCCH receiving information to receive the data transmitted over the PDSCH.

However, usually, to ensure reliable receiving of the PDCCH, a plurality of pieces of PDCCH receiving information are configured for the terminal. For example, four pieces of PDCCH receiving beam information or four pieces of reference signal resource information may be usually configured for the terminal to indicate four PDCCH receiving beams configured for the terminal. In a specific implementation, a PDCCH receiving information set may be configured for the terminal by using higher layer signaling, layer 2 signaling, or layer 1 signaling. The set includes a plurality of pieces of PDCCH receiving information to indicate a plurality of pieces of PDCCH receiving information. In this way, another method is further required to enable the terminal to determine a piece of information in the set that is the information that is identical to the PDCCH receiving information and that is indicated by the first indication information.

This embodiment of this application provides the following two methods to enable the terminal to determine a piece of information in the set that is the information that is identical to the PDCCH receiving information and that is indicated by the first indication information.

Method 1: The network device uses second indication information to indicate a piece of information in the PDCCH receiving information set that is the information that is identical to the PDCCH receiving information and that is indicated by the first indication information.

Optionally, the first indication information and the second indication information may be carried in one piece of DCI, for example, carried in different information fields in one piece of DCI. Further, an information field that carries the second indication information may be located before an information field that carries the first indication information. The first indication information and the second indication information may alternatively be carried in different fields of a same information field in one piece of DCI. For example, in the same information field in the DCI, the first K fields (or bits) are used to carry the first indication information, and the last N-K fields (or bits) are used to carry the second indication information.

Optionally, the first indication information and the second indication information may be joint-coded, and the joint-coded indication information is carried in a piece of DCI. That is, the first indication information and the second indication information may be the same indication information. In this way, a process of transmitting the second indication information may be omitted. The joint-coded indication information corresponds to the first indication information and the second indication information. That is, the first indication information and the second indication information can be obtained based on the joint-coded indication information. Using an example in which three PDSCH receiving beams and four PDCCH receiving beams are configured for the terminal, the joint-coded indication information includes 3 bits. The value 000 of the three bits is used to indicate the PDSCH receiving beam 1 configured for the terminal, the value 0001 of the three bits is used to indicate the PDSCH receiving beam 2 configured for the terminal, the value 010 of the three bits is used to indicate the PDSCH receiving beam 2 configured for the terminal, the value 100 of the three bits is used to indicate that the PDSCH receiving beam is a beam identical to the PDCCH receiving beam 1, the value 101 of the three bits is used to indicate that the PDSCH receiving beam is a beam identical to the PDCCH receiving beam 2, the value 110 of the three bits is used to indicate that the PDSCH receiving beam is a beam identical to the PDCCH receiving beam 3, and the value 111 of the three bits is used to indicate that the PDSCH receiving beam is a beam identical to the PDCCH receiving beam 4.

Optionally, the first indication information and the second indication information may alternatively be carried in different pieces of DCI. For example, the first indication information is carried in first DCI, and the second indication information is carried in second DCI; or the first indication information is first DCI, and the second indication information is second DCI.

In this embodiment of this application, the second indication information may be used to directly indicate or indirectly indicate a piece of information in the PDCCH receiving information set that is the information identical to the PDCCH receiving information. For example, a piece of information in the PDCCH receiving information set that is the information identical to the PDCCH receiving information is indicated by using a reference signal resource index transmitted by the network device, by using a BPL, or by using QCL information that is associated with the reference signal resource and that is transmitted by the network device.

If four PDCCH receiving beams are configured, and the second indication information is used to perform an indication by using two bits, the value and the meaning of the two bits may be shown in Table 7:

TABLE 7

| Value of indication information of a PDSCH receiving beam | Meaning of the indication information of the PDSCH receiving beam |
| --- | --- |
| 00 | Index value of the PDCCH receiving beam 1 |
| 01 | Index value of the PDCCH receiving beam 2 |
| 10 | Index value of the PDCCH receiving beam 3 |
| 11 | Index value of the PDCCH receiving beam 4 |

In Table 7, the index values of the four PDCCH receiving beams are 0, 1, 2, and 3 respectively. The network device may use the second indication information to transmit one of the index values of the four PDCCH receiving beams in Table 7 to the terminal, so that the terminal can determine one of the four PDCCH receiving beams that is the beam identical to the PDCCH receiving beam.

The index value of the PDCCH receiving beam in Table 7 may alternatively be replaced with the BPL, or replaced with the QCL that is associated with the reference signal resource and that is transmitted by the network device.

In the method 1, the information identical to the PDCCH receiving information is notified to the terminal by using the second indication information, so that the network device can flexibly indicate the information identical to the PDCCH receiving information in view of a specific situation (such as data receiving performance of the terminal), thereby enabling the terminal to accomplish relatively good data receiving performance.

Method 2: The information identical to the PDCCH receiving information is pre-agreed. Specifically, a piece of receiving information in the PDCCH receiving information set configured for the terminal that is the information that is identical to the PDCCH receiving information and that is indicated by the first indication information is pre-agreed.

In some embodiments of the method 2, receiving information that meets specific conditions in a plurality of pieces of PDCCH receiving information configured for the terminal may be used as the pre-agreed information. For example, it may be pre-agreed that the information identical to the PDCCH receiving information is receiving information with highest receiving channel quality among all pieces of receiving information for the terminal to receive a PDCCH. The channel quality may be represented by a PDCCH reference signal received power (RSRP), may be represented by reference signal received quality (RSRQ), or may be represented by a parameter such as a signal-to-noise ratio (SNR) or a channel quality indicator (CQI). Using an example in which four PDCCH receiving beams are configured for the terminal, if the network device uses the first indication information to notify the terminal that the PDSCH receiving beam of the terminal is a beam identical to the PDCCH receiving beam, the terminal may select, based on PDCCH-RSRPs measured when the PDCCH is received by using four PDCCH receiving beams, a highest one of the PDCCH-RSRPs, and a receiving beam used when the highest PDCCH-RSRP is obtained is used to receive a subsequent PDSCH.

When the terminal receives the PDCCH by using a specific receiving beam (which is referred to as a "first receiving beam" below for convenience), if the RSRP of the PDCCH is greater than an RSRP measured when the terminal receives the PDCCH by using another receiving beam, the terminal can also achieve relatively good PDSCH receiving performance when the terminal receives the PDSCH by using the beam identical to the first PDCCH receiving beam.

In some other embodiments of the method 2, a specific piece of receiving information (for example, the receiving information that corresponds to a PDCCH detection resource and that is configured for the terminal) in a plurality of pieces of PDCCH receiving information configured for the terminal may be used as the pre-agreed receiving information. The detection resource may be one of or a combination of: a PDCCH candidate resource, PDCCH search space, or a PDCCH control channel resource set (CORESET); or may be a group of resources in PDCCH candidate resources, or a group of resources in search space, or a group of resources in a CORESET. The receiving information may be indicated by a reference signal index that is QCLed with the CORESET, or indicated by a QCL.

The foregoing embodiments of the method 2 are merely examples. The embodiments of this application do not restrict a piece of PDCCH receiving information in the PDCCH receiving beam set that serves as the pre-agreed receiving information, or restrict a condition that the receiving information in the set serving as the pre-agreed receiving information meets.

Compared with the method 1 (in which notification is performed by using additional DCI), the method 2 (that is based on pre-agreement) can reduce transmission overheads of the indication information.

Figure 3:
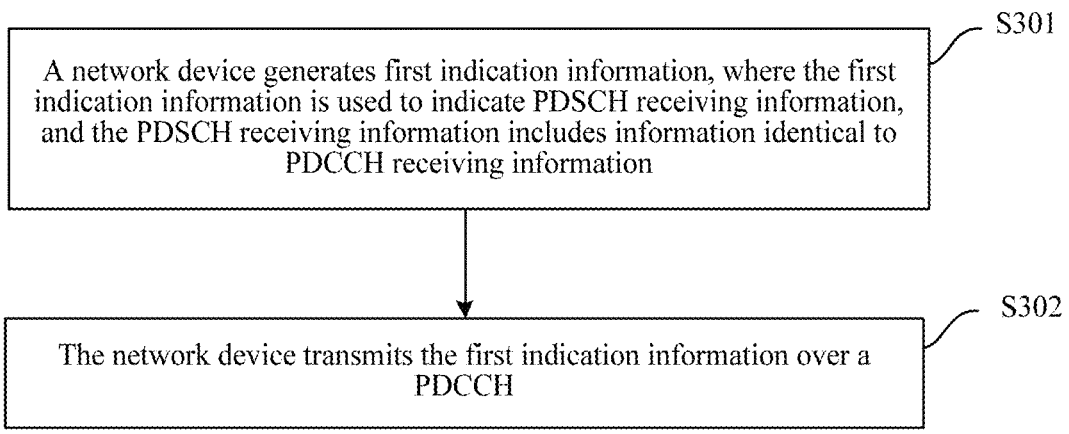
FIG. 3 is a schematic flowchart of indicating a receiving beam according to an embodiment of this application.

Based on the foregoing description, FIG. 3 shows an example of a process of indicating PDSCH receiving information according to an embodiment of this application. As shown in FIG. 3, the process may include the following steps.

S301: A network device generates first indication information.

The first indication information is used to indicate PDSCH receiving information, and the PDSCH receiving information includes information identical to PDCCH receiving information. For example, a PDSCH receiving beam indicated by the first indication information may be a PDSCH receiving beam configured by the network device for a terminal, or may be a beam that is identical to a PDCCH receiving beam and that is indicated in the foregoing embodiment of this application. Based on a data receiving status of the terminal (for example, based on an ACK/NACK fed back by the terminal), the network device may determine whether to use the first indication information to indicate to the terminal the PDSCH receiving beam configured for the terminal, or to notify the terminal that the PDSCH receiving beam of the terminal is a beam identical to the PDCCH receiving beam.

Usually, in a downlink data transmission process, the terminal may feed back a data receiving status (such as an ACK/NACK) to the network device over a PUSCH, and the network device may determine data receiving performance of a PDSCH of the terminal based on the feedback information from the terminal.

In an example, based on the ACK/NACK fed back by the terminal, the network device determines that the terminal can receive a PDCCH but cannot receive the PDSCH (that is, cannot demodulate data transmitted over the PDSCH), or determines that PDSCH receiving performance is relatively poor. In this case, the network device generates first indication information, and uses the first indication information to indicate to the terminal that the PDSCH receiving beam of the terminal is a beam identical to the PDCCH receiving beam, that is, instruct the terminal to receive the PDSCH using the beam identical to the PDCCH receiving beam.

In this step, the method for indicating the PDSCH receiving information may be to directly indicate the receiving information, to indirectly indicate the receiving information by using a reference signal resource index transmitted by the network device, to indirectly indicate the receiving information by using a BPL, or to indirectly indicate the receiving information by using a QCL that is associated with a reference signal resource and that is transmitted by the network device. For specific implementation, refer to the foregoing embodiments, and no repeated description is given herein again.

S302: The network device transmits the first indication information over the PDCCH.

Optionally, the network device uses an RNTI of the terminal to scramble CRC of DCI that is used to carry the first indication information, and then transmit the DCI.

Further, in some examples, if the network device configures a PDCCH receiving information set by using higher layer signaling, layer 1 signaling, or layer 2 signaling, and the set includes a plurality of PDCCH receiving information, the network device further transmits second indication information. The second indication information is used to indicate the PDCCH receiving information identical to the PDCCH receiving information. The information indicated by the second indication information is one of the plurality of pieces of PDCCH receiving information configured for the terminal. Based on the second indication information, the terminal may determine a piece of information in the PDCCH receiving information set that is the information that is identical to the PDCCH receiving information and that is indicated by the first indication information. As described above, the method for transmitting the first indication information and the second indication information is described in the foregoing embodiments, and is not detailed herein again.

Further, in some other examples, if the network device configures a PDCCH receiving information set by using higher layer signaling, layer 1 signaling, or layer 2 signaling, and the set includes a plurality of pieces of PDCCH receiving information, a beam identical to the PDCCH receiving information may be pre-agreed. To be specific, a piece of information in the PDCCH receiving information set that can be used as a PDSCH receiving beam is pre-agreed. In this way, after receiving the first indication information, the terminal can determine, based on the pre-agreement, a piece of PDCCH receiving information in the set that is the PDSCH receiving information identical to the PDCCH receiving information.

Figure 4:
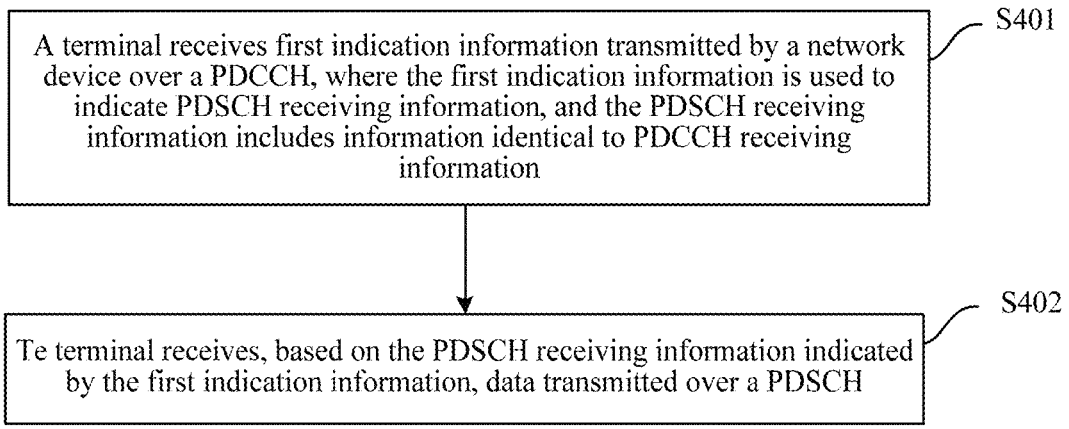
FIG. 4 is a schematic flowchart of data receiving according to an embodiment of this application.

Based on the foregoing description, FIG. 4 shows an example of a data receiving process according to an embodiment of this application. The process may include the following steps.

S401: A terminal receives first indication information transmitted by a network device over a PDCCH. For description of the first indication information, refer to the foregoing embodiments, and no repeated description is given herein again.

S402. The terminal receives, based on PDSCH receiving information indicated by the first indication information, data transmitted over a PDSCH.

If the network device configures one piece of PDCCH receiving information for the terminal, and the network device uses the first indication information to indicate that the PDSCH receiving information is information identical to the PDCCH receiving information, the terminal can determine that the PDSCH receiving information indicated by the first indication information is the information identical to the only piece of PDCCH receiving information configured.

If the network device configures a PDCCH receiving information set for the terminal, and the set includes a plurality of pieces of PDCCH receiving information, the network device further transmits second indication information to the terminal, and the terminal can determine, based on the second indication information, a piece of PDCCH receiving information in the set that is identical to the PDSCH receiving information indicated by the first indication information, and receive the PDSCH by using the receiving information indicated by the corresponding receiving information.

If the network device configures a PDCCH receiving information set for the terminal, and the set includes a plurality of pieces of PDCCH receiving information, through pre-agreement, the terminal can determine, when the first indication information is received and indicates that the PDSCH receiving information is information identical to the PDCCH receiving information, a piece of information in the set that is identical to the PDSCH receiving information indicated by the first indication information. For a specific pre-agreement manner, refer to the foregoing embodiments, and no repeated description is given herein again.

With reference to a network architecture shown in FIG. 1, values of indication information of PDSCH receiving beams listed in Table 1, and values of indication information of PDCCH receiving beams listed in Table 7, in one scenario, a base station 120 generates first DCI at a time point t0, scrambles CRC of the first DCI by using an RNTI of a terminal 110, and then transmits the first DCI over a PDCCH. A value of indication information of a PDSCH receiving beam in the first DCI is "00". The terminal 110 demodulates the PDCCH to obtain the first DCI, and based on the indication information of the PDSCH receiving beam in the first DCI, uses a PDSCH receiving beam 1 with an index value 0 to receive data transmitted over a PDSCH. At a subsequent time point t1, based on an ACK/NACK fed back by the terminal 110, the base station 120 determines that the terminal 110 can receive the PDCCH but cannot receive the PDSCH, or that PDSCH receiving performance is relatively poor. Therefore, the base station generates first DCI, uses an RNTI of the terminal 110 to scramble CRC of the first DCI and then transmits the first DCI over the PDCCH. The value of the indication information of the PDSCH receiving beam in the first DCI is "11". The base station 120 further generates second DCI, uses the RNTI of the terminal 110 to scramble the CRC of the second DCI, and then transmits the second DCI over the PDCCH. A value of indication information of a PDCCH receiving beam in the second DCI is "00". The terminal 110 demodulates the PDCCH to obtain the first DCI and the second DCI, and based on the first DCI and the second DCI that are obtained through demodulation, uses a beam identical to a PDCCH receiving beam 1 (an index value of the PDCCH receiving beam 1 is 0) to receive the data transmitted over the PDSCH.

With reference to the network architecture shown in FIG. 1, the values of the indication information of the PDSCH receiving beams listed in Table 1, and the values of the indication information of the PDCCH receiving beams listed in Table 7, in another scenario, it is pre-agreed that the beam identical to the PDCCH receiving beam is a receiving beam with a highest received power among all receiving beams for the terminal to receive the PDCCH. The base station 120 generates first DCI at a time point to, uses the RNTI of the terminal 110 to scramble the CRC of the first DCI, and then transmits the first DCI over the PDCCH. The value of the indication information of the PDSCH receiving beam in the first DCI is "00". The terminal no demodulates the PDCCH to obtain the first DCI, and based on the indication information of the PDSCH receiving beam in the first DCI, uses a PDSCH receiving beam 1 with an index value 0 to receive data transmitted over the PDSCH. At a subsequent time point t1, based on an ACK/NACK fed back by the terminal 110, the base station 120 determines that the terminal 110 can receive the PDCCH but cannot receive the PDSCH, or that PDSCH receiving performance is relatively poor. Therefore, the base station generates first DCI, uses an RNTI of the terminal 110 to scramble CRC of the first DCI and then transmits the first DCI over the PDCCH. The value of the indication information of the PDSCH receiving beam in the first DCI is "11". The terminal no demodulates the PDCCH to obtain the first DCI. Because the value of the indication information of the PDSCH receiving beam in the first DCI is "11", based on the foregoing pre-agreement, the terminal selects the receiving beam with the highest received power among all receiving beams for the terminal to receive the PDCCH (herein it is assumed that the receiving beam with the highest received power is the PDCCH receiving beam 1), and uses the beam identical to the PDCCH receiving beam 1 to receive the data transmitted over the PDSCH.

In this embodiment of this application, if the terminal receives the PDCCH by using an analog receiving beam, a PDCCH decoding delay may occur. Based on information such as a capability of the terminal, the terminal may determine duration of the PDCCH decoding delay and report the duration to the network device, or the network device configures the duration of the PDCCH decoding delay of the terminal for the terminal, or predefines the duration of the PDCCH decoding delay. The network device may further transmit configuration information to the terminal by using higher layer signaling, layer 2 signaling, or layer 1 signaling. The configuration information indicates to the terminal, within a PDCCH decoding delay period, whether the PDSCH receiving information is identical to the PDCCH receiving information or identical to system information block (SS block) receiving information, and may further indicate a piece of information in a PDCCH receiving information set or in a system information block receiving information set that is identical to the PDSCH receiving information. In this way, the terminal can receive the PDSCH within the PDCCH decoding delay period by using the information identical to the PDCCH receiving information or identical to the system information block receiving information.

Based on the foregoing solution, in a downlink transmission process, the network device transmits first indication information over the PDCCH to indicate the PDSCH receiving information to the terminal. Because the terminal uses an analog receiving beam, a PDCCH decoding delay occurs. Therefore, the first indication information cannot be obtained through decoding based on the PDCCH, and the PDSCH receiving information indicated by the first indication information cannot be obtained. In this case, within the PDCCH decoding delay period, the terminal receives the PDSCH based on the receiving information indicated by the configuration information (for example, receives the PDSCH by using a beam identical to the PDCCH receiving beam or the system information block receiving beam). After the PDCCH decoding delay, the terminal can obtain the first indication information through decoding based on the PDCCH. Therefore, based on the first indication information obtained through decoding, the terminal can use the PDSCH receiving information indicated by the indication information to receive data transmitted over the PDSCH.

Figure 5:
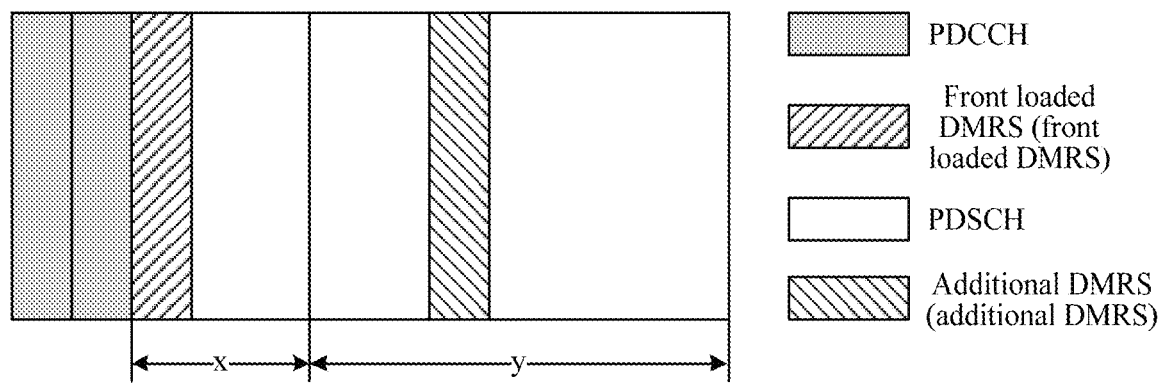
FIG. 5 is a schematic structural diagram of an apparatus for indicating a receiving beam according to an embodiment of this application.

As shown in FIG. 5, using the PDCCH and the PDSCH shown in FIG. 2 as an example, a time period x is a PDCCH decoding delay period of the terminal, and a time period y is a period after the PDCCH decoding delay. The network device transmits configuration information to the terminal by using higher layer signaling, layer 2 signaling, or layer 1 signaling to indicate that, within the PDCCH decoding delay period, the PDSCH receiving beam is identical to the PDCCH receiving beam 1 in the PDCCH receiving beam set. In a downlink transmission process, the terminal receives the PDSCH in the time period x by using the PDCCH receiving beam 1, and receives the PDSCH in the time period y by using the PDSCH receiving beam indicated by the DCI obtained through decoding based on the PDCCH.

Because two parts of the PDSCH use different receiving information (for example, as shown in FIG. 5, the beam identical to the PDCCH receiving beam 1 is used in the time period x, and the PDSCH receiving beam indicated by the DCI is used in the time period y), channels of the two parts are different, and corresponding channels need to be demodulated by using different DMRSs. Therefore, whether an additional DMRS exists needs to be indicated to the terminal. In view of this, based on the foregoing solution, existence of an additional DMRS may be implicitly indicated by the first indication information. For example, if the first indication information transmitted by the network device does not include the indication information of the PDSCH receiving beam, it indicates that no additional DMRS exists; or if the first indication information transmitted by the network device includes the indication information of the PDSCH receiving beam, it indicates that an additional DMRS exists. Compared with a method in which existence of an additional DMRS is indicated through dynamic signaling, the method in which existence of an additional DMRS is implicitly indicated can reduce signaling overheads.

The foregoing mainly describes the solutions according to the embodiments of this application from a perspective of interaction between the terminal and the network device. It may be understood that, to implement the foregoing functions, the terminal and the network device include a corresponding hardware structure and/or software module that performs each function. With reference to examples of units (components) and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional units (components) of the terminal and the network device may be divided based on the foregoing method examples. For example, functional units (components) may be divided corresponding to functions, or two or more functions may be integrated into one processing unit (component). The integrated unit (component) may be implemented in a form of hardware, or may be implemented in a form of a software functional unit (component). It should be noted that, in the embodiments of this application, unit (component) division is an example, and is merely logical function division. In an actual implementation, another division manner may be used.

Figure 6:
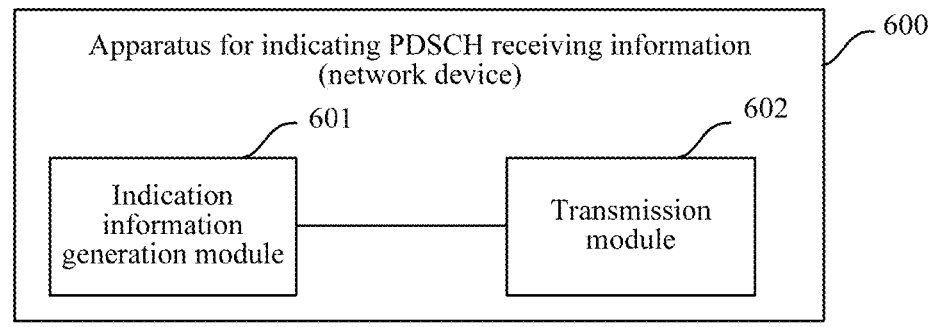
FIG. 6 is a schematic structural diagram of an apparatus for indicating receiving information according to an embodiment of this application.

When an integrated unit (component) is used, FIG. 6 is a schematic structural diagram of an apparatus for indicating receiving information according to an embodiment of this application. The apparatus for indicating receiving information is applicable to a network device. Referring to FIG. 6, the apparatus 600 for indicating receiving information includes an indication information generation module 601 and a transmission module 602. The indication information generation module 601 is configured to generate first indication information. The first indication information is used to indicate PDSCH receiving information, where the PDSCH receiving information includes information identical to PDCCH receiving information. The transmission module 602 is configured to transmit the first indication information over a PDCCH.

In a possible design, the indication information generation module 601 further generates second indication information, where the second indication information is used to indicate the PDSCH receiving information identical to the PDCCH receiving information, information indicated by the second indication information is one of N pieces of PDCCH receiving information configured for a terminal, and N is an integer greater than 1. The transmission module 602 further transmits the second indication information over the PDCCH.

In a possible design, the information identical to the PDCCH receiving information is pre-agreed.

In a possible design, the pre-agreed PDCCH receiving information is receiving information with highest receiving channel quality among all pieces of receiving information for the terminal to receive a PDCCH.

In a possible design, the PDCCH receiving information is: receiving information that corresponds to a PDCCH detection resource and that is configured for the terminal.

In a possible design, the PDSCH receiving information or PDCCH receiving information is indicated: by a reference signal resource index transmitted by the network device; or by QCL information that is associated with a reference signal resource and that is transmitted by the network device.

Figure 7:
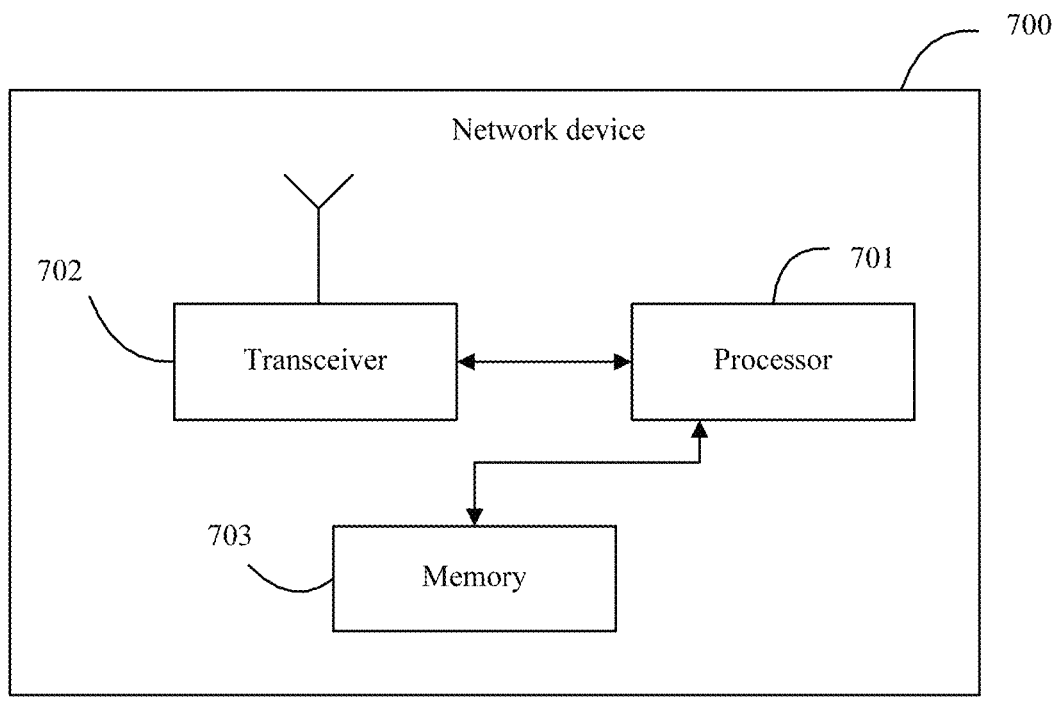
FIG. 7 is a schematic structural diagram of a communications apparatus according to an embodiment of this application.

FIG. 7 is a schematic structural diagram of a network device 700 according to an embodiment of this application, that is, another schematic structural diagram of the apparatus 600 for indicating PDSCH receiving information. Referring to FIG. 7, the network device 700 includes a processor 701 and a transceiver 702. The processor 701 may also be a controller. The processor 701 is configured to support a terminal in performing related functions in FIG. 3. The transceiver 702 is configured to support the network device in performing functions of transmitting and receiving messages. The network device 700 may further include a memory 703. The memory 703 coupled to the processor 701 is configured to store a program instruction and data that are necessary for the terminal. The processor 701 and the transceiver 702 are connected to the memory 703. The memory 703 is configured to store an instruction, and the processor 701 is configured to execute the instruction stored in the memory 703 to control the transceiver 702 to transmit and receive a signal, so as to perform steps of performing corresponding functions by the network device in the foregoing method.

In this embodiment of this application, for concepts, explanations, detailed descriptions, and other steps that are related to the apparatus 600 for indicating PDSCH receiving information and the network device 700 and that are related to the technical solutions provided in the embodiments of this application, refer to the description about the content in the foregoing method embodiment or other embodiments, and no repeated description is given herein again.

Figure 8:
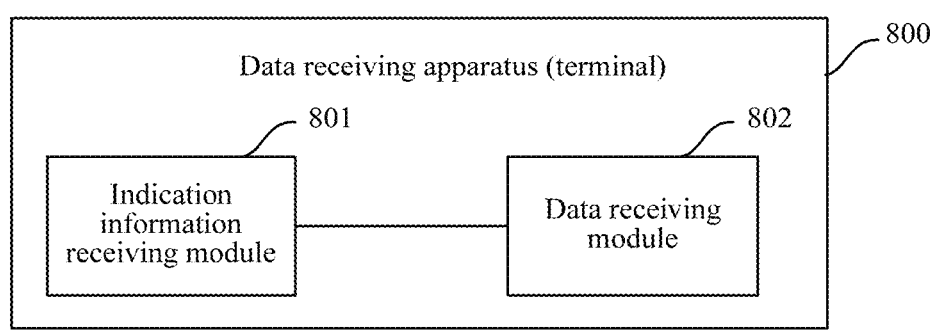
FIG. 8 is a schematic structural diagram of a data receiving apparatus according to an embodiment of this application.

When an integrated unit (component) is used, FIG. 8 is a schematic structural diagram of a data receiving apparatus according to an embodiment of this application. The data receiving apparatus is applicable to a terminal. Referring to FIG. 8, the data receiving apparatus 800 includes an indication information receiving module 801 and a data receiving module 802. The indication information receiving module 801 is configured to receive first indication information transmitted by a network device over a PDCCH. The first indication information is used to indicate PDSCH receiving information, where the PDSCH receiving information includes information identical to PDCCH receiving information. The data receiving module 802 is configured to receive, based on the PDSCH receiving information indicated by the first indication information, data transmitted over a PDSCH.

In a possible design, the indication information receiving module 801 further receives second indication information transmitted by the network device over the PDCCH, where the second indication information is used to indicate the PDSCH receiving information identical to the PDCCH receiving information, information indicated by the second indication information is one of N pieces of PDCCH receiving information configured for a terminal, and N is an integer greater than 1.

In a possible design, the information identical to the PDCCH receiving information is pre-agreed.

In a possible design, the pre-agreed PDCCH receiving information is receiving information with highest receiving channel quality among all pieces of receiving information for the terminal to receive a PDCCH.

In a possible design, the PDCCH receiving information is: receiving information that corresponds to a PDCCH detection resource and that is configured for the terminal.

In a possible design, the PDSCH receiving information or PDCCH receiving information is indicated: by a reference signal resource index transmitted by the network device; or by QCL information that is associated with a reference signal resource and that is transmitted by the network device.

Figure 9:
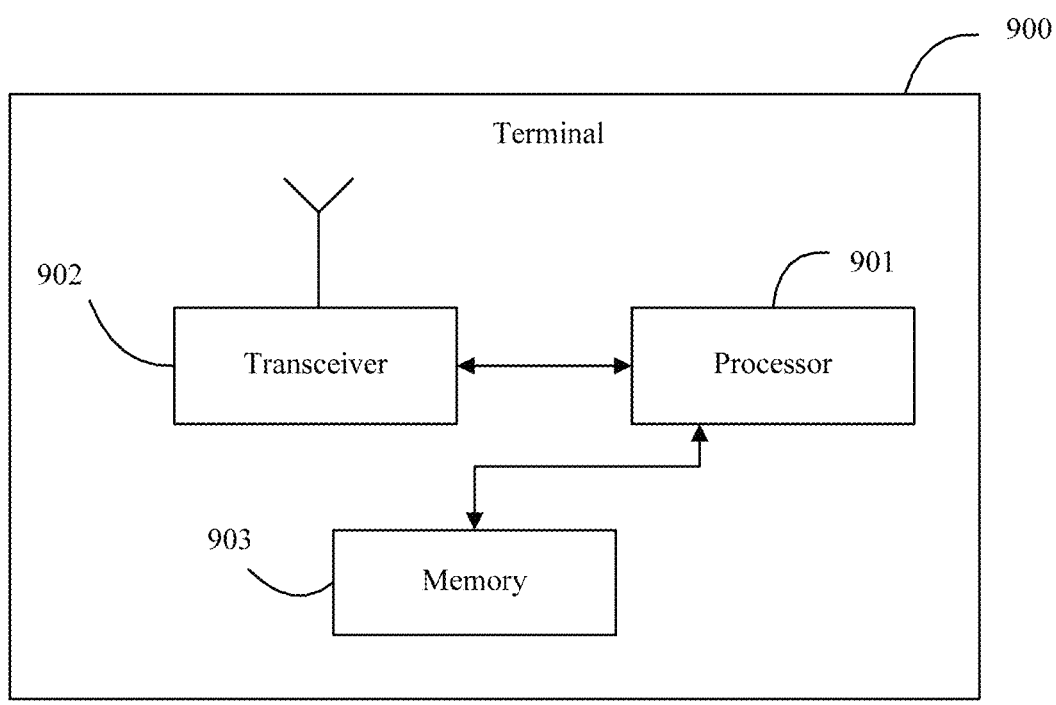
FIG. 9 is a schematic structural diagram of another communications apparatus according to an embodiment of this application.

FIG. 9 is a schematic structural diagram of a terminal 900 according to an embodiment of this application, that is, another schematic structural diagram of the data receiving apparatus 800. Referring to FIG. 9, the terminal 900 includes a processor 901 and a transceiver 902. The processor 901 may also be a controller. The processor 901 is configured to support the terminal in performing related functions in FIG. 5. The transceiver 902 is configured to support the terminal in performing functions of transmitting and receiving messages. The terminal 900 may further include a memory 903. The memory 903 coupled to the processor 901 is configured to store a program instruction and data that are necessary for the terminal. The processor 901 and the transceiver 902 are connected to the memory 903. The memory 903 is configured to store an instruction, and the processor 901 is configured to execute the instruction stored in the memory 903 to control the transceiver 902 to transmit and receive a signal, so as to perform steps of performing corresponding functions by the terminal in the foregoing method.

In this embodiment of this application, for concepts, explanations, detailed descriptions, and other steps that are related to the data receiving apparatus 800 and the terminal 900 and that are related to the technical solutions provided in the embodiments of this application, refer to the description about the content in the foregoing method embodiment or other embodiments, and no repeated description is given herein again.

Understandably, only simplified designs of the network device and the terminal are shown in the accompanying drawings of the embodiments of this application. In actual application, the network device and the terminal are not limited to the foregoing structures, and may further include, for example, an antenna array, a duplexer, and a baseband processing part.

The duplexer of the network device is configured to implement an antenna array, and is used to both transmit and receive signals. A transmitter is configured to implement conversion between a radio frequency signal and a baseband signal. Usually, the transmitter may include a power amplifier, a digital-to-analog converter, and a frequency converter. Usually, a receiver may include a low noise amplifier, an analog-to-digital converter, and a frequency converter. The receiver and the transmitter may sometimes be collectively referred to as a transceiver. The baseband processing part is configured to implement processing of transmitted or received signals, such as layer mapping, precoding, modulation/demodulation, encoding/decoding, and perform processing for a physical control channel, a physical data channel, a physical broadcast channel, a reference signal, and the like separately. For another example, the terminal may further include a display device, an input/output interface, and the like.

The terminal may have a single antenna or a plurality of antennas (that is, an antenna array). The duplexer of the terminal is configured to implement an antenna array, and is used to both transmit and receive signals. A transmitter is configured to implement conversion between a radio frequency signal and a baseband signal. Usually, the transmitter may include a power amplifier, a digital-to-analog converter, and a frequency converter. Usually, a receiver may include a low noise amplifier, an analog-to-digital converter, and a frequency converter. The baseband processing part is configured to implement processing of transmitted or received signals, such as layer mapping, precoding, modulation/demodulation, encoding/decoding, and perform processing for a physical control channel, a physical data channel, a physical broadcast channel, a reference signal, and the like separately. In an example, the terminal may further include a control part, configured to request an uplink physical resource, calculate channel state information (CSI) corresponding to a downlink channel, determine whether a downlink data packet is successfully received, or the like.

It should be noted that the foregoing related processor in the embodiments of this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor, and or the like.

The memory may be integrated in the processor or disposed separately from the processor.

In an implementation, functions of the receiver and the transmitter may be implemented by a transceiver circuit or a dedicated transceiver chip. The processor may be implemented by a dedicated processing chip, a processing circuit, a processor, or a general-purpose chip.

In another implementation, program code that implements functions of the processor, the receiver, and the transmitter is stored in the memory, and a general-purpose processor implements the functions of the processor, the receiver, and the transmitter by executing the code in the memory.

According to the method provided in the embodiments of this application, a communications system is further provided in an embodiment of this application. The communications system includes the foregoing network device and one or more terminals.

An embodiment of this application further provides a computer storage medium. The computer storage medium is configured to store some instructions. When being executed, the instructions can perform any method related to the foregoing terminal or network device.

An embodiment of this application further provides a computer program product. The computer program product is configured to store a computer program, and the computer program is used to perform the method described in the foregoing method embodiments.

An embodiment of this application further provides a chip. The chip includes a processor, configured to support a terminal in implementing functions related to a network device in the foregoing embodiments. In a possible design, the chip further includes a memory, and the memory is configured to store a program instruction and data that are necessary for the terminal.

An embodiment of this application further provides a chip. The chip includes a processor, configured to support a terminal in implementing functions related to the terminal in the foregoing embodiments. In a possible design, the chip further includes a memory, and the memory is configured to store a program instruction and data that are necessary for the terminal.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method, comprising:
   receiving, by a terminal, first indication information transmitted by a network device over a first physical downlink control channel (PDCCH), wherein the first indication information indicates a piece of physical downlink shared channel (PDSCH) receiving information, and the piece of PDSCH receiving information is identical to a piece of N pieces of PDCCH receiving information configured for the terminal, and N is an integer greater than 1;
   receiving, by the terminal, second indication information transmitted by the network device over a second PDCCH, wherein the second indication information indicates the piece of PDSCH receiving information that is identical to the piece of PDCCH receiving information, and the first PDCCH is the same PDCCH or a different PDCCH than the second PDCCH; and
   receiving, by the terminal, based on the piece of PDSCH receiving information, data transmitted over a PDSCH.

2. The method according to claim 1, wherein:
   which piece of PDCCH receiving information, from the N pieces of PDCCH receiving information configured for the terminal, is identical to the piece of PDSCH receiving information is preset, wherein N is an integer greater than 1; or
   which condition is satisfied by the piece of PDCCH receiving information, from the N pieces of PDCCH receiving information, is preset, wherein N is an integer greater than 1.

3. The method according to claim 1, wherein the piece of PDCCH receiving information comprises:
   receiving information that corresponds to a PDCCH detection resource and that is configured for the terminal.

4. The method according to claim 1, wherein the piece of PDSCH receiving information or the piece of PDCCH receiving information is indicated:
   by a reference signal resource index transmitted by the network device; or
   by quasi co-location (QCL) assumption information that is associated with a reference signal resource and that is transmitted by the network device.

5. An apparatus, comprising:
   at least one processor;
   and a non-transitory computer-readable storage medium coupled to the at least one processor and storing programming instructions for execution by the at least one processor, wherein the programming instructions instruct to:
   generate first indication information, wherein the first indication information indicates a piece of physical downlink shared channel (PDSCH) receiving information, and the piece of PDSCH receiving information is identical to a piece of N pieces of physical downlink control channel (PDCCH) receiving information configured for a terminal, and N is an integer greater than 1;
   generate second indication information, wherein the second indication information indicates the piece of PDSCH receiving information that is identical to the piece of PDCCH receiving information; and
   cause a transceiver to transmit the first indication information over a first PDCCH and the second indication information over a second PDCCH, wherein the first PDCCH is the same PDCCH or a different PDCCH than the second PDCCH.

6. The apparatus according to claim 5, wherein the first indication information further indicates the piece of PDCCH receiving information.

7. An apparatus, comprising:
   at least one processor;
   and a non-transitory computer-readable storage medium coupled to the at least one processor and storing programming instructions for execution by the at least one processor, wherein the programming instructions instruct to:
   cause a transceiver to receive first indication information transmitted by a network device over a first physical downlink control channel (PDCCH), wherein the first indication information indicates physical downlink shared channel (PDSCH) receiving information, and the PDSCH receiving information is identical to PDCCH receiving information, wherein the first indication information comprises information indicating that the PDSCH receiving information is associated with the PDCCH receiving information, and wherein the PDSCH receiving information being associated with the PDCCH receiving information comprises: a quasi co-location (QCL) assumption relation existing between a PDSCH and a third PDCCH, wherein the first PDCCH and the third PDCCH are a same PDCCH or are different PDCCHs; and cause the transceiver to receive, based on the PDSCH receiving information indicated by the first indication information, data transmitted over the PDSCH.

8. The apparatus according to claim 7, wherein the first indication information further comprises the PDCCH receiving information that is identical to the PDSCH receiving information.

9. The apparatus according to claim 7, wherein the first indication information further indicates the PDCCH receiving information.

10. The apparatus according to claim 7, wherein the programming instructions further instruct to:

cause the transceiver to receive second indication information transmitted by the network device over a second PDCCH, wherein the second indication information indicates the PDSCH receiving information that is identical to the PDCCH receiving information, the PDSCH receiving information indicated by the second indication information is one of N pieces of PDCCH receiving information configured for a terminal, N is an integer greater than 1, and the first PDCCH is the same PDCCH or a different PDCCH than the second PDCCH.

11. The apparatus according to claim 7, wherein:

which PDCCH receiving information, from N pieces of PDCCH receiving information configured for the apparatus, is the PDCCH receiving information is preset, wherein N is an integer greater than 1; or which condition is satisfied by the PDCCH receiving information, from the N pieces of PDCCH receiving information, is preset, wherein N is an integer greater than 1.

12. The apparatus according to claim 7, wherein the PDCCH receiving information is:

receiving information that corresponds to a PDCCH detection resource and that is configured for a terminal.

13. The apparatus according to claim 7, wherein the PDSCH receiving information or the PDCCH receiving information is indicated:

by a reference signal resource index transmitted by the network device; or by quasi co-location (QCL) assumption information that is associated with a reference signal resource and that is transmitted by the network device.

\* \* \* \* \*